United States Patent Office
3,663,712
Patented May 16, 1972

3,663,712
4,4'-BIS(ALPHA-AMINO SUBSTITUTED) DIPHENYL ETHERS AS ANTIMICROBIAL AGENTS
Bogislav von Schmeling, Hamden, Conn., and Walter R. Boos, Guelph, Ontario, Canada, assignors to Uniroyal, Inc., Middleburg, Conn., and Uniroyal, Ltd., Montreal, Quebec, Canada
No Drawing. Filed Sept. 25, 1969, Ser. No. 861,153
Int. Cl. A01n 9/20
U.S. Cl. 424—330         16 Claims

ABSTRACT OF THE DISCLOSURE 4,4'-bis(alpha-amino substituted) diphenyl ethers of the formula:

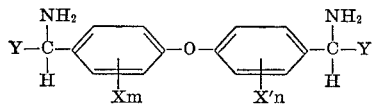

where the X's are for example halogen or alkyl, and the Y's are for example alkyl, phenyl, or substituted phenyl, are useful as agricultural or industrial bactericides and fungicides. Typical chemicals are 4,4'-bis(alpha-amino-m-methylbenzyl) diphenyl ether and 4,4'-bis(alpha-aminoethyl) diphenyl ether. Agricultural uses of the chemicals include control of bean halo blight caused by the bacterium *Pseudomonas phaseolicola*.

---

This invention relates to a method of controlling microbes, particularly bacteria and fungi, and to materials normally subject to microbiological decomposition, but made resistant to such decomposition, by incorporation of certain 4,4'-bis(alpha-amino substituted) diphenyl ethers.

The invention involves applying to a locus, subject to attack by microbes, a 4,4'-bis(alpha-amino substituted) diphenyl ether of the formula

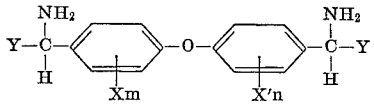

where the X's are the same or different and are halogen (e.g., chlorine, bromine, etc.), alkyl (especially lower alkyl, as in methyl, ethyl, etc.), alkoxy (especially lower alkoxy, as in methoxy, ethoxy, etc.), or hydrogen, $m$ and $n$ are the same or different and are 1 or 2, and the Y is alkyl (especially lower alkyl as in methyl, ethyl, etc.) or aryl (e.g., phenyl, naphthyl, biphenyl, etc.), including substituted aryl, as represented by such substituted aryl radicals as phenyl substituted with one or two of the following substituents: alkyl (especially lower alkyl as in methyl, ethyl, etc.) alkoxy (especially lower alkoxy as in methoxy, ethoxy, etc.), halogen (e.g., chlorine, bromine, etc.), and the like.

The invention makes possible the control, in vivo or in vitro, of such microorganisms as bacteria or fungi, whether in agricultural uses, or non-agricultural uses such as the protection of fuel oil, fabrics, etc., from injury by microbes. Agricultural uses include the control of vegetable and fruit diseases such as the bacterial blights and leaf spots.

Examples of the chemicals employed in the invention are 4,4''-bis(alpha-aminobenzyl) diphenyl ether,
4,4'-bis(alpha-amino-m-methylbenzyl) diphenyl ether,
4,4'-bis(alpha-amino-o-methylbenzyl) diphenyl ether,
4,4-bis(alpha-amino-p-methylbenzyl) diphenyl ether,
4,4'-bis(alpha-amino-p-methoxybenzyl) diphenyl ether,
2-chloro-4,4'-bis(alpha-aminobenzyl) diphenyl ether,
2,2'-dichloro-4,4'-bis(alpha-aminobenbyl) diphenyl ether,
4,4'-bis(alpha-amino-p-chlorobenzyl) diphenyl ether,
4,4'-bis(alpha-aminoethyl) diphenyl ether.

Preferred chemicals for the control of bacteria are 4,4'-bis(alpha-amino-m-methylbenzyl) diphenyl ether,
4,4'-bis(alpha-aminobenzyl) diphenyl ether,
4,4''-bis(alpha-amino-o-methylbenzyl) diphenyl ether,
4,4'-bis(alpha-amino-p-methylbenzyl) diphenyl ether, and
2-chloro-4,4'-bis(alpha-aminobenzyl) diphenyl ether.

Preferred chemicals for the control of fungi are 4,4'-bis(alpha-aminobenzyl) diphenyl ether,
4,4'-bis(alpha-amino-p-methylbenzyl) diphenyl ether,
4,4'-bis(alpha-amino-p-methoxybenzyl) diphenyl ether,
4,4'-bis(alpha-amino-o-methylbenzyl) diphenyl ether and
4,4'-bis(alpha-aminoethyl) diphenyl ether.

The chemicals useful in the invention may be prepared by known methods. For example, the preparation of 4,4'-bis(alpha - aminobenzyl) diphenyl ether and 4,4' - bis (alpha-amino-p-methylbenzyl) diphenyl ether is disclosed by Brown et al. in J. Chem. Soc., 1954, p. 877. In more detail, one method of preparing chemicals useful in the invention is represented by the equations:

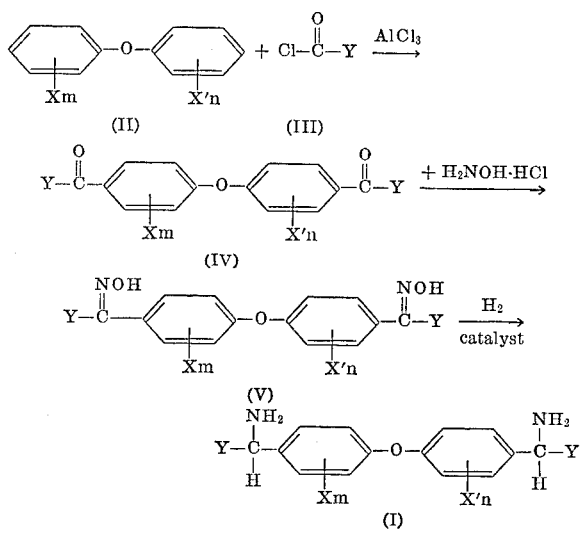

It will be seen from the foregoing equations that the method involves the provision of an appropriate diphenyl ether (II), reacting it with the appropriate acid chloride (III) by a Friedel-Craft reaction to form a diketone (IV). The diketone (IV) may be converted, by reaction with hydroxylamine hydrochloride, into the corresponding dioxime (V). The dioxime (V) in turn may be converted into the desired amine (I) by catalytic hydrogenation.

The following preparations illustrate the preparation of typical chemicals useful in the invention.

Chemical A—4,4' - Bis(alpha-amino-m-methylbenzyl) diphenyl ether.

Step (1)—Preparation of 4,4'-bis(m-methylbenzoyl) diphenyl ether. To a stirred suspension of anhydrous aluminum trichloride (80.1 g.) in 300 ml. of dry 1,2-dichloroethane at room temperature is added a mixture of 92.7 g. (0.6 mole) of m-methylbenzoyl chloride and 51 g. (0.3 mole) of diphenyl ether, dropwise over a period of approximately 15 minutes. The temperature of the reaction mixture rises to 60–70° (all temperatures are expressed herein in degrees centigrade) and is kept in that range by the rate of addition. Hydrogen chloride gas is evolved from the mixture and is removed under reduced pressure. Following the addition of the reagents the reaction is externally heated with stirring to maintain the temperature at 70° plus or minus 5°, for 3 hours. The mixture is then allowed to cool to room temperature, and is poured into 1 kg. of crushed ice to destroy the aluminum chloride complex. The ice is allowed to melt and the water is separated from the organic layer. The later is washed once with 250 ml. of 10% hydrochloric acid, five times with water, and the solvent is removed by distillation. The residual crude crystals of 4,4'-bis(m-methylmenzoyl) diphenyl ether are recrystallized from ethyl alcohol and yield 125 g. (97%) of material, M.P. 104–105°.

Step (2)—Preparation of 4,4'-bis(m-methylbenzoyl) diphenyl ether dioxime. A mixture of 18.2 g. of 4,4'-bis-(m-methylbenzoyl) diphenyl ether, 7 g. of hydroxylamine hydrochloride, 9 g. of sodium acetate, and 400 ml. of ethyl alcohol is heated to a gentle reflux for 24 hours. It is then added to 1.5 l. of water and allowed to stand for 12 hours by which time crystals have formed. The crystals are collected on a funnel, washed with water, and dried first at room temperature, and then in an oven for 5 hours. The yield of the oxime is 18 g. (90% of the theory) M.P. 182–185°.

Step (3)—Conversion to 4,4'-bis(alpha-amino-m-methylbenzyl) diphenyl ether. A reaction mixture is prepared from 40 g. of 4,4'-bis(m-methylbenzoyl) diphenyl ether dioxime, 400 ml. of absolute ethyl alcohol which is saturated with ammonia gas, and 2 g. of activated Raney nickel catalyst W–6. This mixture is subjected to 500 p.s.i. of pressure in a hydrogen atmosphere, heated at 90°, and stirred. The conditions are maintained for 6 hours. The alcohol and ammonia are removed by vacuum distillation. Thirty-five g. (93% of the theory) of an amber viscous material is obtained which could not be crystallized.

I.R. spectrum: double at 3375 cm.$^{-1}$ and 3300 cm.$^{-1}$, NH$_2$; 3025 cm.$^{-1}$, aromatic ring; 2920 cm.$^{-1}$ and 2855 cm.$^{-1}$, CH$_3$; 1590 cm.$^{-1}$ and 7500 cm.$^{-1}$, aromatic ring; 845 cm.$^{-1}$, 1,4-disubstituted benzene ring; 775 cm.$^{-1}$ and 700 cm.$^{-1}$, 1,3-disubstituted benzene ring.

Chemical B.—2,2' - dichloro - 4,4'-bis-(alpha-aminobenzyl) diphenyl ether. The first step is the chlorination of 4,4'-bis(benzoyl) diphenyl ether. For this purpose, 36.4 g. of 4,4'-bis(benzoyl) diphenyl ether is suspended in 400 ml. of dry carbon tetrachloride and 2 g. of iodine is added as a catalyst. This suspension is stirred in a 3-neck 1000 ml. flask and a four-fold excess of chlorine is bubbled through over a period of 6 hours. The reaction temperature is maintained between 40° and 50° with external heating. The carbon tetrachloride is distilled from the reaction mixture and, for the purpose of purification, the remaining substance is dissolved in warm 95% ethyl alcohol and filtered hot. The 2,2'-dichloro-4,4'-bis(dibenzoyl) diphenyl ether crystallizes as a white substance after cooling, and is filtered and dried. The yield is 29.2 g. (68%), M.P. 134°–137°. This substance is converted first into the oxime and finally into the desired amine, 2,2'-dichloro-4,4'-bis(alpha-aminobenzyl) diphenyl ether, in the same manner as in preparation of Chemical A, above. By crystallization from benzene there is obtained 25.5 g. of a white crystalline material, M.P. 235–265°.

*Analysis.*—Calcd. for $C_{26}H_{22}Cl_2N_2O$ (percent): C, 69.49; H, 4.93; N, 6.23; Cl, 15.78. Found (percent): C, 70.04; H, 5.14; N, 6.14; Cl, 15.82.

Chemical C.—2 - chloro-4,4'-bis(alpha-aminobenzyl) diphenyl ether. The chlorination step as in preparation of Chemical B is repeated using only a twofold excess of chlorine, and the product (2 - chloro - 4,4' - dibenzoyldiphenyl ether) isolated as colorless crystals, M.P. 108–112°.

*Analysis.*—Calcd. for $C_{26}H_{17}ClO_3$: Cl, 8.59%. Found: Cl, 8.49%.

It is converted into the dioxime (M.P. 85°–90°) and then into the desired diamine by the procedure given for the preparation of Chemical A, above. 2-chloro-4,4'-bis (α-amino-benzyl) diphenyl ether forms colorless crystals, M.P. 274–6°.

*Analysis.*—Calcd. for $C_{26}H_{23}ClN_2O$ (percent): C, 75.26; H, 5.59; N, 6.75; Cl, 8.55. Found (percent): C, 75.03; H, 5.40; N, 6.23; Cl, 8.72.

The chemicals employed in this invention possess a high degree of bactericidal activity controlling such bacteria as: *Pseudomonas aeruginosa* (Schroeter) Migula, *Escherichia coli* (Migula) Castellani and Chalmers, *Staphylococcus aureus* Rosenbach, *Desulfovibrio desulfuricans* (Beijerinck) Kluyver and van Niel, *Streptococcus pyogenes* Rosenbach, *Xanthomonas phaseoli* (Smith) Dowson and *Erwinia amylovora* (Burrill) Winslow et al.

The chemicals employed in this invention also control fungi such as *Alternaria solani* (Ellis and Mastin) Sorauer, *Cladosporium resinae* f. *resinae* de Vries, *Hormodendrum* spp., *Chaetomium globosum* Kunze ex Fries, *Aurobasidium* (Pullularia) *pullulans* (de Bary and Loew) Berkhout, *Candida albicans* (Robin) Berkhout, *Trichophyton mentagrophytes* (Robin) Blanchard and *Uromyces phaseoli typica* Arth.

In agricultural applications, the chemical may be applied directly to plants (e.g., seeds, foliage) or to soil in which plant life is growing or is to be grown, to protect the plant life against the harmful effects of such pathogenic microbes as bacteria and fungi. For example, the chemical may be applied to seeds by tumbling the chemical with the seeds, either alone or in admixture with a powdered solid carrier, to coat the seeds. Typical powdered solid carriers are the various mineral silicates, e.g., mica, talc, pyrophillite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, non-ionic, or cationic surface-active agents. Such surface-active agents are well known and reference is made to U.S. Pat. No. 2,547,724, columns 3 and 4, for detailed examples of the same. As a seed protectant, the amount of the chemical coated on the seeds will be ¼ to 12 ounces per hundred pounds of the seed. As a soil treatment for fungi and the like, the chemical may be applied as a dust in admixture with sand or soil or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil treatment, the amount of the chemical applied to the seed rows will be from 0.1 to 10 pounds per acre applied to the seed rows the equivalent of an area 2" wide and 2" deep to parallel rows in one direction a distance of 40" apart. Also, as a soil treatment, the chemical may be applied broadcast as a similar dust or aqueous spray with an application rate of 1.0 to 100 pounds per acre. As a foliage treatment (e.g., fungicidal or bactericidal), the chemical may be applied to growing plants at a rate of ¼ to 10 pounds per acre. Such application is generally as an aqueous spray which also contains a surface-active dispersing agent, with or without a powdered solid carrier or a hydrocarbon solvent. These sprays usually are repeated at time intervals ranging from three days to two weeks during the growing season. Typical formulations are as follows:

(a) Emulsifiable concentrate:

|  | Percent |
|---|---|
| 4,4' - bis(alpha - amino-m-methylbenzyl)diphenyl ether | 48.1 |
| Tween 80 (polyoxyethylene sorbitan monooleate) | 11.1 |
| Xylene | 40.8 |
| Total | 100.0 |

(b) Wettable powder:

| | Percent |
|---|---|
| 4,4' - bis(alpha - amino-m-methylbenzyl) di-phenyl ether | 75.0 |
| Triton X–120 [1] | 2.0 |
| Daxad–11 [2] | 2.0 |
| Dixie clay | 21.0 |
| Total | 100.0 |

[1] Alkylaryl polyether alcohol 9-10 moles polyethylene oxide, in dry powdered form (40% active on an insoluble carrier). The active ingredient in Triton X–120 is Triton X–100, which is a liquid nonionic surfactant (isooctyl phenyl polyethoxy ethanol, obtained by condensing the alkylphenol with ethylene oxide).
[2] Polymerized sodium salts of alkyl naphthalene sulfonic acid. (More particularly, the sodium salts of dinaphthylmethane sulfonic acids obtained from naphthalene, sulfuric acid and formaldehyde, according to U.S. Pat. 1,336,759, Schmidt, Apr. 13, 1920 [referred to in 2,451,787, Vincent, Oct. 19, 1948].)

As industrial bactericides and fungicides, the present chemicals may be used to control bacteria or fungi by contacting the bacteria or fungi with the chemical in any suitable manner. Materials capable of nourishing bacteria and fungi may be protected from destruction by such pests by contacting, mixing, or impregnating with the chemical. Such materials include petroleum oils, fuel oils, fabrics, cellulosic materials in various forms including textiles, wood, paper, etc. The chemicals can be combined with other pesticidal control agents such as other fungicides or bactericides for broadening their spectrum or increasing their effects as well as insecticides or miticides.

The following examples, in which all quantities are expressed by weight unless otherwise indicated, will serve to illustrate the practice of the invention in more detail.

EXAMPLE 1

This example illustrates the effectiveness of the presently employed chemicals as bactericides.

Thirty-five milligrams (or less, to provide the concentrations indicated in Table I, below) of chemical is dissolved in 5 ml. acetone to which 45 ml. of a 0.01% aqueous solution of a wetting agent (e.g., octyl phenoxy polyethoxy ethanol, Triton X–100) is added. Three ml. of this preparation is pipetted into a 50 ml. Erlenmeyer flask containing 5 ml. nutrient agar and kept liquefied at 48°. The bacterial inoculum consisting of a cell suspension of Escherichia coli or Staphylococcus aureus is then added to the nutrient-chemical preparation in the amount of 0.25 ml. per flask. Thus each flask contains a chemical concentration of 255 p.p.m. or less. The nutrient-chemical bacterial mixture is poured into 2½ inch plastic Petri dishes, allowed to harden and incubated at 30°. Observations for growth are made at 24, 48, 72 and 168 hours. The chemical treatments are compared with an untreated, inoculated control using a bacterial growth evaluation of growth or no growth. The results are exemplified by the 48 hour inspection as shown in Table I. The untreated controls of both bacteria show complete coverage of the agar plate surface with bacterial colonies at the time of the 24 hour reading. The data in Table I indicate that these chemicals are effective bactericides against a broad spectrum of bacteria such as the Gram-positive type St. aureus as well as the Gram-negative type E. coli.

EXAMPLE 2

This example illustrates the effectiveness of the presently employed chemicals as bactericides for water-flood operations in secondary oil recovery. The chemicals are tested against the anaerobic bacterium Desulfovibrio desulfuricans, a deteriorative agent in secondary oil recovery procedures, fuel storage tanks, pipelines, etc. This test is conducted according to the American Petroleum Institute "Recommended Practice for Biological Analysis of Water-Flood Injection Waters," API-Rp 38, first edition, May 1959, Section II. In the test, weighed portions of the compounds are dissolved in 10 ml. of acetone transferred to 90 ml. of distilled water containing three drops per liter of an non-ionic surface-active agent (octyl phenoxy polyethoxy ethanol). Aliquots are removed from this stock solution (usually containing 1,000 or 100 p.p.m. of chemical) to sterile, screw capped, clear one-ounce bottles sufficient to obtain a final concentration of 1, 5, 10, 50 and 100 p.p.m.

To each bottle is added sulfate reducing broth inoculated with Desulfovibrio desulfuricans (1.5%). The recipe for the sulfate reducing broth is as follows:

Sodium lactate, U.S.P.—4.0 ml.
Yeast extract—1.0 gm.
Ascorbic acid—0.1 gm.
$MgSO_4 7H_2O$—0.2 gm.
$K_2HPO_4$ (anhydrous)—0.01 gm.
$Fe(SO_4)_2(NH_4)_2 6H_2O$—0.1 gm.
Sodium chloride—10.1 gm.
Distilled water—1000.0 ml.
pH adjusted to 7.5

The caps are replaced and the bottles incubated at 32–35° with daily observations for one week and weekly observations thereafter for a total of 4 weeks' incubation. An untreated control without added chemical shows severe growth after 48 hours incubation. The results of the test are shown in Table II.

TABLE II

[Effectiveness against anaerobic bacterium Desulfovibrio desulfuricans]

| Chemical | Concentration (p.p.m.) | | | | |
|---|---|---|---|---|---|
| | 100 | 50 | 10 | 5 | 1 |
| 4,4'-bis(alpha-aminobenzyl)diphenyl ether | 0 | 0 | 0 | 0 | + |
| 4,4'-bis(alpha-amino-m-methylbenzyl)diphenyl ether | 0 | 0 | 0 | 0 | + |
| 4,4'-bis(alpha-amino-p-methoxybenzyl)diphenyl ether | 0 | 0 | 0 | 0 | + |
| 4,4'-bis(alpha-amino-p-chlorobenzyl)diphenyl ether | 0 | 0 | 0 | + | + |
| 2,2'-dichloro-4,4'-bis(alpha-aminobenzyl)-diphenyl ether | 0 | 0 | + | + | + |

NOTE.—0 = no growth in 4 weeks.  + = growth in 4 weeks.

EXAMPLE 3

This example evaluates the chemicals of this invention as foliage protectant fungicides using the fungus Alternaria solani as the test organism. One gram of the chemical to be tested is ground with 3 ml. of acetone and 50 mg. of a non-ionic surface-active agent (octyl phenoxy polyethoxy ethanol). The acetone and surface-active agent are known to be inactive in the biological tests run. The mixture is diluted with water, giving suspensions containing 500 to 2000 p.p.m. of the chemical. These suspensions are sprayed on duplicate six inch tomato plants (variety Clark's Early

TABLE I

[Bacterial growth evaluation at various dilutions (p.p.m.) after 48 hours incubation]

| | Staphylococcus aureus | | | | | | Escherichia coli | | | | | |
|---|---|---|---|---|---|---|---|---|---|---|---|---|
| Dilution | 255 | 128 | 64 | 32 | 16 | 8 | 255 | 128 | 64 | 32 | 16 | 8 |
| Chemical: | | | | | | | | | | | | |
| 4,4'-bis(alphaaminobenzyl)diphenylether | 0 | 0 | 0 | 0 | 0 | + | 0 | 0 | 0 | 0 | 0 | + |
| 4,4-'bis(alphaamino-m-methylbenzyl)diphenylether | 0 | 0 | 0 | 0 | 0 | + | 0 | 0 | 0 | 0 | 0 | + |
| 2-chloro-4,4'bis(alpha-aminobenzyl)diphenylether | 0 | 0 | 0 | 0 | + | + | 0 | 0 | 0 | 0 | + | + |
| 4,4'-bis(alphaamino-p-chlorobenzyl)diphenylether | 0 | 0 | 0 | + | + | + | 0 | 0 | 0 | 0 | + | + |
| 4,4'-bis(alpha-aminobenzyl)-2,2'dichlorodiphenyl ether | 0 | 0 | 0 | + | + | + | 0 | 0 | 0 | 0 | | |
| 4,4'-bis(alpha-amino-p-methoxybenzyl)diphenyl ether | 0 | 0 | + | + | + | | 0 | 0 | + | + | + | + |
| 4,4-bis(alpha-aminoethyl)diphenyl ether | 0 | 0 | + | | | | 0 | + | | | | |

NOTE.—0 = no growth.  + = growth within 48 hours.

Special) using a gun-type sprayer which delivers 2.5 ml. per second. The plants are then placed in the greenhouse, together with untreated check plants. Twenty-four hours later the treated and untreated check plants are inoculated with a suspension of *Alternaria solani* spores by means of a 20 second spray from an atomizer sprayer (delivery rate 1 ml. per second). The plants are then kept overnight in a control chamber at a temperature of 23.9° and 100% relative humidity. In the morning the plants are transferred to the greenhouse. Three days later the disease is scored by comparing the number of disease lesions of the treated plants with the untreated check.

The formula to determine percent control is:

$$100 - \left(\frac{\text{Avg. no. lesions on treated plant}}{\text{Avg. no. lesions on untreated plant}} \times 100\right) = \text{percent control}$$

The results are shown in Table III.

TABLE III

[Foliage protectant fungicidal test]

| Chemical | Percent disease control | |
|---|---|---|
| | 2,000 p.p.m. | 500 p.p.m. |
| 4,4'-bis(alpha-aminobenzyl)diphenyl ether | 98 | 97 |
| 4,4'-bis(alpha-amino-p-methoxybenzyl)diphenyl ether | 90 | 70 |

EXAMPLE 4

This example evaluates the chemicals of this invention as antimicrobial agents for the preservation of petroleum hydrocarbons. Petroleum hydrocarbons are known to be utilized by bacteria and fungi as a food source. The resulting increase in microbial population can cause various problems such as filter plugging, metal corrosion of storage tanks and aircraft fuel tanks, fuel line plugging and flame-outs. A biocide added to hydrocarbon fuels can prevent microbial growth and eliminate the problems mentioned. The test is conducted essentially as outlined in "Proposed Procedures for the Screening of Microbial Inhibitors in Hydrocarbon/water Systems," Society for Industrial Microbiology Special Publication Number 2, pp. 3–4.

Ten ml. of sterile Bushnell-Haas solution is dispensed in sterile 25 x 150 mm. screw cap test tubes. An overlay of 10 ml. of jet fuel (JP–4), sterile, is added to give a 1.1 ratio of hydrocarbon/water. The test compound is added to the hydrocarbon phase of concentrations from 100 to 1,000 p.p.m. The test organisms are added in 0.1 ml. amounts (*Pseudomonas aeruginosa* and *Cladosporium resinae*). The test tubes are incubated at 25° for 14–28 days with daily agitation and observations for growth. Weekly streak plates are made on TGE agar and Sabouraud dextrose agar for confirmation of growth. The results, as shown in Table IV, are recorded as growth or no growth.

TABLE IV

Hydrocarbon-water test

Test media formulations: Gram/liter Distilled $H_2O$
(1) Bushnell-Haas Medium (pH 6.8–7.0):
  Magnesium sulfate ($MgSO_4 \cdot 7H_2O$) _____ 0.20
  Calcium chloride ($CaCl_2$) _____ 0.02
  Potassium phosphate, monobasic
    ($KH_2PO_4$) _____ 1.00
  Ammonium nitrate ($NH_4NO_3$) _____ 1.00
  Potassium phosphate, dibasic ($K_2HPO_4$) _ 1.00
  Ferric chloride ($FeCl_3$) 60% aqueous sol.[1]
(2) TGE agar (pH 6.8–7.0):
  Beef extract _____ 3.0
  Tryptone _____ 5.0
  Glucose _____ 1.0
  Agar _____ 15.0
(3) Sabouraud dextrose agar (pH 5.6):
  Peptone _____ 10.0
  Dextrose _____ 4.0
  Agar _____ 15.0

[1] 2 drops.

RESULTS

| Chemical | 28 day growth evaluation | | |
|---|---|---|---|
| | P.p.m. | Bacteria | Fungi |
| 4,4'-bis(alpha-amino-benzyl)diphenyl ether | 1,000 | 0 | 0 |
| | 100 | + | 0 |

NOTE.—0=no growth.  +=growth.

EXAMPLE 5

This example demonstrates the effectiveness of the chemicals of this invention as material preservatives against cellulosic degrading fungi causing deterioration of textiles, paper, wood, etc. The test chemical is applied to 14 ounce cotton duck by immersion, using a 1% solvent solution (e.g., in acetone), for 5 minutes. The fabric is drained and dried in an oven at 60° for 15 minutes. Samples are then tested according to Federal Specification CCC–T–191b, Textile Test Methods, Method 5751, Non-sterile Specimen Method. The test is carried out as follows: Treated and untreated (control) 2 x 2 inch squares of the duck are placed individually on sterile, hardened mineral salts agar in Petri dishes. The squares are then inoculated with 2.0 ml. of a fungal spore suspension of *Chaetomium globosum* USDA 1042.4. The dishes are incubated for 14 days at 28–30°. Unleached samples, and samples leached by 24 hours immersion with six hand changes in water are visually examined for signs of growth with results shown in Table V.

TABLE V

[Cotton fabric test]

| Chemical | Evaluation of growth after 2 week incubation, Chaetomium globosum | |
|---|---|---|
| | Unleached | Leached |
| 4,4'-bis(alpha-aminobenzyl)diphenyl ether | None | None |
| Untreated control | Heavy | Heavy |

EXAMPLE 6

This example evaluates chemicals of the invention against certain pathogenic organisms using a serial dilution method. The chemicals are dissolved in appropriate solvents (e.g., acetone) and dilutions made in nutrient broths in test tubes. The tubes are inoculated with known amounts of organism suspensions and incubated for 48–96 hours at temperatures optimum for growth (35° for bactria; 29° for fungi). Observations are made for inhibition of growth, with the results set forth in Table VI.

TABLE VI

| Test organism | Inhibiting concentration (p.p.m.) | |
|---|---|---|
| | Chemical I | Chemical II |
| *Candida albicans* | 500 | 200 |
| *Streptococcus pyogenes* | 25 | 100 |
| *Trichophyton mentagrophytes* | 200 | 300 |

NOTE.—Chemical I is 4,4'-bis(alpha-aminobenzyl)diphenyl ether; Chemical II is 4,4'-bis(alpha-amino-p-chlorobenzyl)diphenyl ether.

EXAMPLE 7

This example describes the activity of the chemicals on plants (in vivo) for control of *Xanthomonas phaseoli* (common bean blight) and *Pseudomonas phaseolicola* (halo blight of beans).

Three hundred mg. of chemicals are dissolved in 10 ml. acetone, 60 mg. Triton X–100 emulsifier (octyl phenoxy polyethoxy ethanol) and 140 ml. distilled water. This gives a chemical concentration of 2000 p.p.m. in 150 ml. spray solution. Aliquots of this preparation are taken for serial dilutions.

This preparation is then sprayed on duplicate pots of Tender-green beans, each pot containing three plants. The growth stage of the beans at the time of the chemical spray is just before expansion of the first trifoliate leaves. The chemical applications are made with a sprayer delivering 2.5 ml. spray per second. After the plants are allowed to dry the primary leaves are slightly injured by lightly pressing a device (meat tenderizer) having protuberances on the surfaces on the upper leaf surface against a large rubber stopper held underneath the primary bean leaf. This injuring method produces an easier entrance for the bacteria in the subsequent inoculation procedure. The treated and injured plants are then inoculated with a spore suspension of *Xanthomonas phaseoli* or *Pseudomonas phaseolicola* by means of spraying for 30 seconds at a delivery rate of 1 ml./second. Pots containing bean plants are included in the test which did not receive the chemical treatment but were injured and inoculated with the bacterium. The pots are then transferred to the green house and kept at 22.2° to 25.6° under moist conditions. The results of the bacterial bean blight are taken 10 days later by checking the degree of severity of the infection which appears as water-soaked spots around the injured leaf areas.

The results, as shown in Tables VII-A and VII-B, indicate that the chemicals are effective bactericides in vivo as well as in vitro. The chemicals gave control of the bacterial infection without phytotoxicity.

TABLE VII-A

[Degree of bacterial infection of bean plants with *Xanthomonas phaseoli*]

| Chemical name | Conc. (p.p.m.) | Degree of infection |
|---|---|---|
| 4,4'-bis(alpha-aminobenzyl)diphenyl ether | 2,000 | Slight. |
|  | 500 | Moderate. |
| 4,4'-bis(alpha-amino-m-methylbenzyl)diphenyl ether. | 2,000 | Trace. |
|  | 500 | Slight. |
| Untreated, inoculated control | | Severe. |

TABLE VII-B

[Degree of bacterial infection of bean plants with *Pseudomonas phaseolicola*]

| Chemical name | Conc. (p.p.m.) | Degree of infection |
|---|---|---|
| 4,4'-bis(alpha-amino-m-methylbenzyl)diphenyl ether. | 2,000 | Slight. |
|  | 500 | Moderate. |
| 2-chloro-4,4'-bis(alpha benzylamino) diphenyl ether. | 2,000 | Slight. |
| Untreated, inoculated control | | Severe. |

EXAMPLE 8

In this example a comparison is made between 4,4'-bis(alpha-aminobenzyl) diphenyl ether and the m- and o-methylbenzyl chemicals, in an in vivo test on Tendergreen bean plants, using a spore suspension of the halo blight bacterium, *Pseudomonas phaesolicola*, according to the procedure of Example 6. Observations of the severity of infection after 12 days in the greenhouse gave the results indicated in Table VIII.

TABLE VIII

[Degree of bacterial infection of bean plants with *Pseudomonas phaseolicola*]

| Chemical | Conc. (p.p.m.) | Degree of infection |
|---|---|---|
| 4,4'-bis(alpha-amino-m-methylbenzyl)diphenyl ether. | 2,000 | Severe. |
|  | 4,000 | Slight. |
| 4,4'-bis(alpha-aminobenzyl)diphenyl ether | 2,000 | Severe. |
|  | 4,000 | Moderate. |
| 4,4'-bis(alpha-amino-o-methylbenzyl)diphenyl ether. | 2,000 | Severe. |
|  | 4,000 | Moderate. |

Having thus described our invention, what we claim and desire to protect by Letters Patent is:

1. The method of controlling bacteria and fungi which comprises contacting bacteria and fungi with a 4,4'-bis(alpha-amino substituted) diphenyl ether of the formula:

$$Y-\underset{H}{\overset{NH_2}{C}}-\underset{X_m}{\text{C}_6H_4}-O-\underset{X'_n}{\text{C}_6H_4}-\underset{H}{\overset{NH_2}{C}}-Y$$

where the X's are the same or different and represent chlorine, bromine, methyl, ethyl, methoxy, ethoxy, or hydrogen, $m$ and $n$ are the same or different and are one or two, and Y represents methyl, ethyl, phenyl, naphthyl, biphenyl, or phenyl substituted with one or two substituents selected from the group consisting of methyl, ethyl, methoxy, ethoxy, chlorine, and bromine, in an amount effective to control said bacteria and fungi.

2. The method of claim 1 in which the said bacteria and fungi are contacted with the said chemical by applying the said chemical to loci subject to attack by said bacteria and fungi.

3. The method of claim 2 in which the organism being controlled is a fungus and the locus to which the said chemical is applied is a plant.

4. The method of claim 2 in which the locus with which the said chemical is brought into contact is a material capable of nourishing bacteria and fungi, whereby said material is protected from destruction by such pests.

5. The method of controlling bacteria which comprises applying to a medium which normally supports the growth of bacteria a chemical selected from the group consisting of 4,4'-bis(alpha-amino-m-methylbenzyl) diphenyl ether,
4,4'-bis(alpha-aminobenzyl) diphenyl ether,
4,4'-bis(alpha-amino-o-methylbenzyl)diphenyl ether
4,4'-bis(alpha-amino-p-methylbenzyl) diphenyl ether and
2-chloro-4,4'-bis(alpha-aminobenzyl) diphenyl ether, in an amount effective to control said bacteria.

6. The method of claim 5 in which the said chemical is 4,4'-bis(alpha-amino-m-methylbenzyl) diphenyl ether.

7. The method of claim 5 in which the said chemical is 4,4'-bis(alpha-aminobenzyl) diphenyl ether.

8. The method of claim 5 in which the said chemical is 4,4'-bis(alpha-amino-o-methylbenzyl) diphenyl ether.

9. The method of claim 1 in which the said chemical is 4,4'-bis(alpha-amino-p-methylbenzyl) diphenyl ether.

10. The method of claim 1 in which the said chemical is 2-chloro-4,4'-bis(alpha-aminobenzyl)diphenyl ether.

11. The method of controlling fungi on plants which comprises applying to plants a chemical selected from the group consisting of 4,4'-bis(alpha-aminobenzyl) diphenyl ether,
4,4'-bis(alpha-amino-p-methoxybenzyl) diphenyl ether,
4,4'-bis(alpha-amino-o-methylbenzyl) diphenyl ether, and
4,4'-bis(alpha-amino-ethyl) diphenyl ether, in an amount effective to control said fungi.

12. The method of claim 11 in which the said chemical is 4,4'-bis(alpha-aminobenzyl) diphenyl ether.

13. The method of claim 11 in which the said chemical is 4,4'-bis(alpha-amino-p-methylbenzyl) diphenyl ether.

14. The method of claim 11 in which the said chemical is 4,4'-bis(alpha-amino-p-methoxybenzyl) diphenyl ether.

15. The method of claim 11 in which the said chemical is 4,4'-bis(alpha-amino-o-methylbenzyl) diphenyl ether.

16. The method of claim 11 in which the said chemical is 4,4'-bis(alpha-aminoethyl) diphenyl ether.

References Cited

FOREIGN PATENTS

| 888,031 | 8/1953 | Germany | 424—340 |
| 1,022,744 | 3/1966 | Great Britain | 424—340 |

OTHER REFERENCES

Journal of the Chemical Society, p. 877, London, 1954.

ALBERT T. MEYERS, Primary Examiner

D. J. FUNDERBURK, Assistant Examiner

PO-1050
(5/69)

UNITED STATES PATENT OFFICE
CERTIFICATE OF CORRECTION

Patent No. 3,663,712           Dated  May 16, 1972

Inventor(s) Bogislav von Schmeling et al.

It is certified that error appears in the above-identified patent and that said Letters Patent are hereby corrected as shown below:

Column 10, lines 37 and 39, for the claim reference numeral "1", each occurrence, read --5--; line 47, for "4,4'-bis(alpha-amino-o-methylbenzyl) diphenyl ether, and" read --4,4'-bis(alpha-amino-p-methoxybenzyl) diphenyl ether--; between lines 47 and 48 insert another line: --4,4'-bis(alpha-amino-p-methylbenzyl) diphenyl ether, and--.

Signed and sealed this 29th day of May 1973.

(SEAL)
Attest:

EDWARD M. FLETCHER, JR.
Attesting Officer

ROBERT GOTTSCHALK
Commissioner of Patents